(12) United States Patent
Carroll

(10) Patent No.: US 7,703,476 B1
(45) Date of Patent: Apr. 27, 2010

(54) TRIGGER MECHANISM FOR A WATER HEATER FAIL SAFE APPARATUS

(76) Inventor: James H. Carroll, 1380 N. High St., Lancaster, OH (US) 43130

( * ) Notice: Subject to any disclaimer, the term of this patent is extended or adjusted under 35 U.S.C. 154(b) by 504 days.

(21) Appl. No.: 11/824,323

(22) Filed: Jul. 2, 2007

(51) Int. Cl.
*F16K 23/00* (2006.01)

(52) U.S. Cl. .................. 137/421; 137/312; 251/74; 122/505

(58) Field of Classification Search .................. 137/312, 137/409, 416, 418, 420–422; 251/74; 122/505; 119/80
See application file for complete search history.

(56) References Cited

U.S. PATENT DOCUMENTS

| | | | | |
|---|---|---|---|---|
| 201,979 | A | * | 4/1878 | Anderson .................. 137/421 |
| 405,449 | A | * | 6/1889 | Wilcox et al. .............. 137/426 |
| 509,401 | A | * | 11/1893 | Scott ........................ 137/414 |
| 700,318 | A | * | 5/1902 | Flagg ........................ 298/30 |
| 1,283,916 | A | * | 11/1918 | Rogers ...................... 137/421 |
| 1,497,946 | A | * | 6/1924 | Schmidt ..................... 251/74 |
| 1,957,466 | A | * | 5/1934 | Martin ....................... 251/74 |
| 3,174,324 | A | * | 3/1965 | Ostertag ..................... 251/74 |
| 3,920,031 | A | * | 11/1975 | Maxfield .................... 137/312 |
| 4,495,960 | A | * | 1/1985 | Cartier et al. .............. 137/410 |
| 5,540,256 | A | * | 7/1996 | Kuo .......................... 137/421 |
| 5,682,919 | A | * | 11/1997 | DiMaggio ................... 137/312 |
| 6,253,785 | B1 | * | 7/2001 | Shumake et al. ............ 137/312 |
| 6,336,469 | B1 | * | 1/2002 | Nixon et al. ................ 137/312 |
| 6,543,471 | B1 | | 4/2003 | Carroll |
| 6,895,990 | B1 | | 5/2005 | Carroll |
| 6,899,122 | B1 | * | 5/2005 | Mele ......................... 137/312 |

* cited by examiner

*Primary Examiner*—John Rivell
*Assistant Examiner*—Craig Price
(74) *Attorney, Agent, or Firm*—Norman B. Rainer

(57) ABSTRACT

A trigger mechanism is provided for a water heater fail safe valve assembly which automatically shuts off the flow of water to a water heater when leakage of water from the water heater is detected in an underlying catch tray. The trigger mechanism includes a vertical housing having a drive rod which is upwardly urged by a spring and holds a resilient valve closing component. A cam member holds the drive rod down, representing the open state of the valve. An accumulation of water in the catch tray causes the cam member to release the drive rod to an upper position which closes the valve.

7 Claims, 5 Drawing Sheets

TRIGGER MECHANISM FOR A WATER HEATER FAIL SAFE APPARATUS

BACKGROUND OF THE INVENTION

1. Field of the Invention

This invention relates to apparatus for preventing flooding as a result of leakage from a water heater located in a building, and more particularly concerns apparatus for detecting such leakage and shutting off water flow to the leaking water heater.

2. Description of the Prior Art

Water heaters, whether in residential or commercial buildings, are susceptible to failure in a manner wherein the water within the heater and water entering the heater will leak uncontrollably onto the underlying floor. Such flooding could cause extensive damage to the building and its contents.

U.S. Pat. No. 6,543,471 describes a spring operated fail safe mechanism which, in response to the rising of a float device within a collecting pan beneath a water heater, causes a trigger mechanism to close a valve that supplies water to said heater. However, said spring mechanism requires a tether line that extends to an operating lever of the valve, and such arrangement compromises reliability. Also, the trigger mechanism involves the sliding removal of a locking post from a close-fitting bore. Such arrangement is subject to malfunction due to effects of corrosion and dirt accumulation.

U.S. Pat. No. 6,895,990 concerns a fail safe device similar to that of U.S. Pat. No. 6,543,471, but employs a valve having a drive rod that is spring driven upwardly for closure. The trigger mechanism employs a lever manipulated cam that maintains force upon the top of the drive rod to keep it down, thereby producing the open state of the valve.

Because the cam has a pointed activating tip adapted to engage the top of the drive rod, it is difficult to position said tip in a stable state upon the top of the drive rod. Any error in such positioning procedure is dangerous to the user because of the forceful motion that can be applied to the lever portion of the cam by the spring that activates the drive rod.

It is accordingly an object of the present invention to provide apparatus of improved reliability for automatically preventing flooding that might be produced by a faulty water heater.

It is a further object of this invention to provide apparatus as in the foregoing object having a trigger mechanism which can be easily and safely manipulated.

It is another object of the present invention to provide apparatus of the aforesaid nature of durable, trouble-free construction and amenable to low cost manufacture.

These objects and other objects and advantages of the invention will be apparent from the following description.

SUMMARY OF THE INVENTION

The above and other beneficial objects and advantages are accomplished in accordance with the present invention by a trigger mechanism for a water heater fail safe valve having a drive rod that is upwardly driven by a spring to produce a closed state of the valve, and when downwardly depressed against the urging of the spring, produces an open state of the valve, said trigger mechanism comprising:

a) paired embracing panels upwardly emergent from said valve in spaced apart parallel juxtaposition and defining a confinement region having open front, rear and upper extremities and a floor member containing a centered aperture, b) a horizontally disposed first axle journaled to said embracing panels adjacent said upper extremities, c) an action arm pivotably mounted upon said axle and adapted to move in a vertical plane centered between said embracing panels, said action arm comprising a lever portion and a cam portion having a curved bearing surface that terminates in a pointed tip, and a laterally directed abutment stub adjacent said pointed tip, d) a drive rod upwardly driven by a spring and passing through said centered aperture and terminating in an uppermost extremity that contacts said curved bearing surface, and e) a control assembly comprised of an elongated lever pivotably secured by a horizontally positioned second axle journaled to said embracing panels at a site below said first axle and adjacent the rear extremity of said confinement region, said lever extending through said confinement region and terminating in a rearward extremity adapted to engage a rod upwardly extending from a float device, and a forward extremity having a downwardly curved contact surface integral with a contiguous rearward notch adapted to engage said abutment stub, whereby f) said valve is placed in an open state when said action arm is rotated to a position where the pointed tip of said cam portion is downwardly directed and in contact with the top extremity of said drive rod, and is placed in a closed state when said tip is displaced from said contact by upward movement of the rearward extremity of said elongated lever.

In preferred embodiments, a protective shield surrounds said action arm, and an extension handle is removably associated with the lever portion of said action arm.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
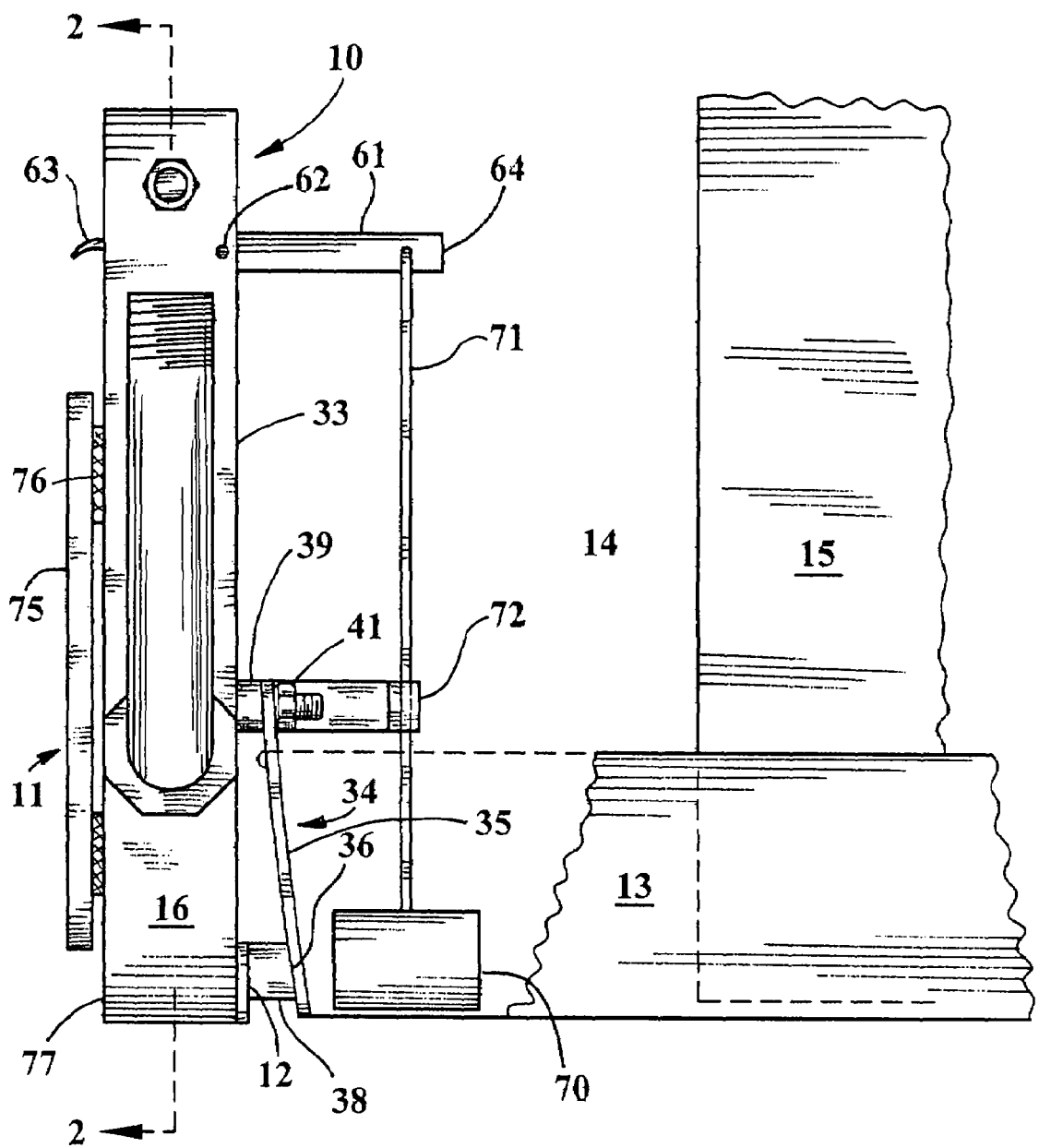
FIG. 1 is a side view of an embodiment of the trigger mechanism of the present invention shown in association with a fail safe valve and a water heater.
Figure 2:
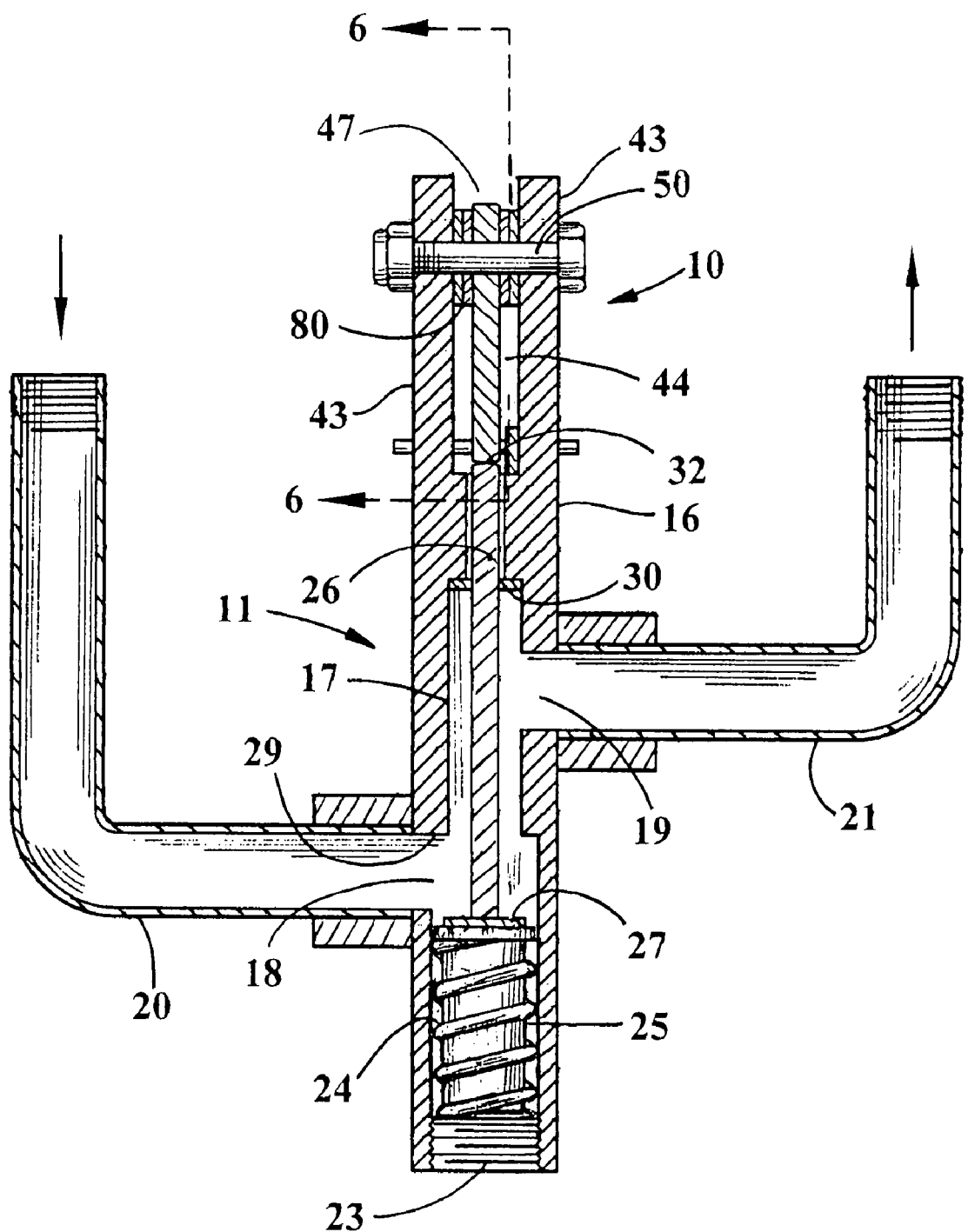
FIG. 2 is an enlarged sectional view taken in the direction of the arrows upon line 2-2 of FIG. 1 and showing said trigger mechanism in a position which places the associated valve in an open state.
Figure 3:
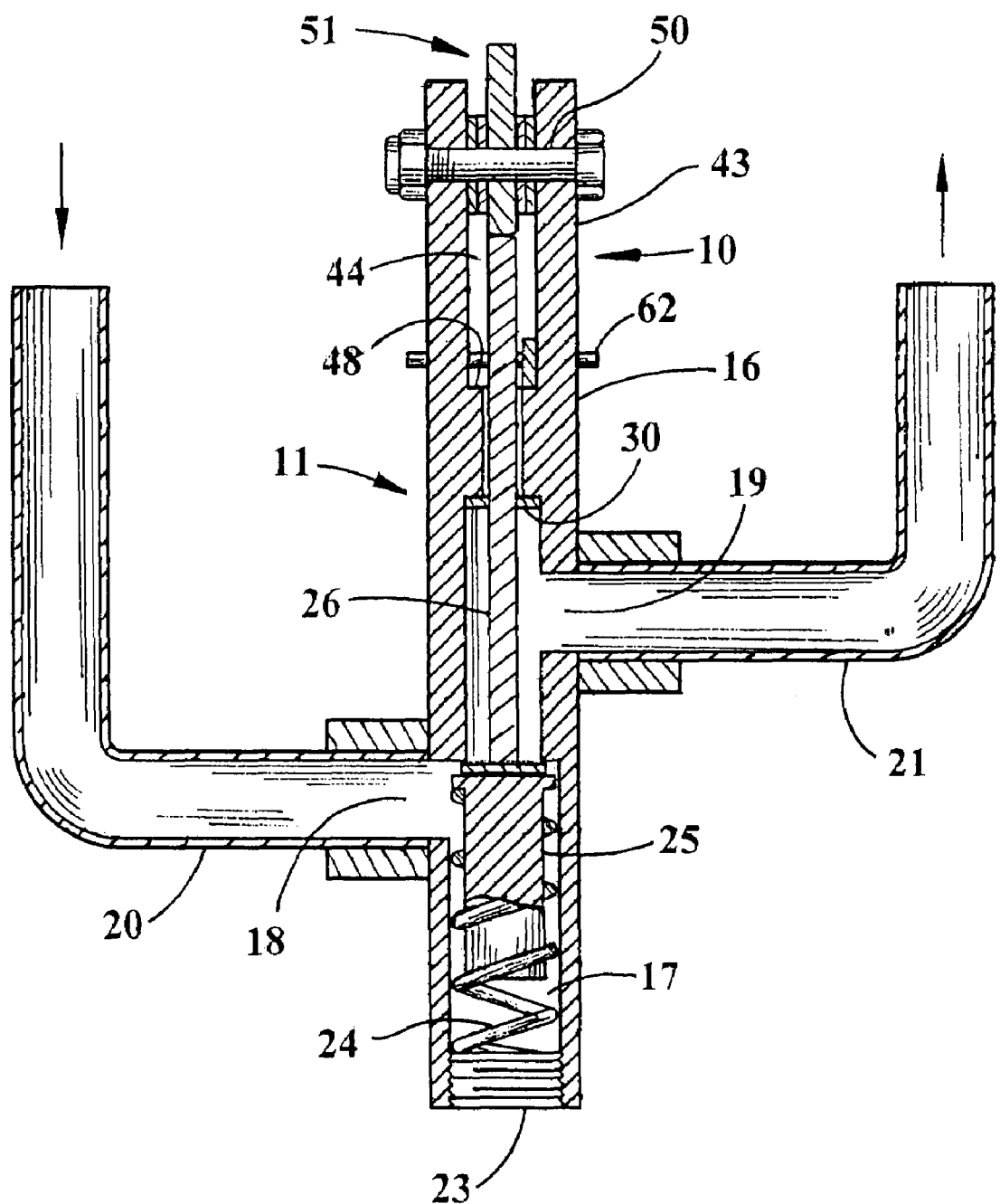
FIG. 3 is similar to FIG. 2 but showing said trigger mechanism in a position which places the associated valve in a closed state.
Figure 4:
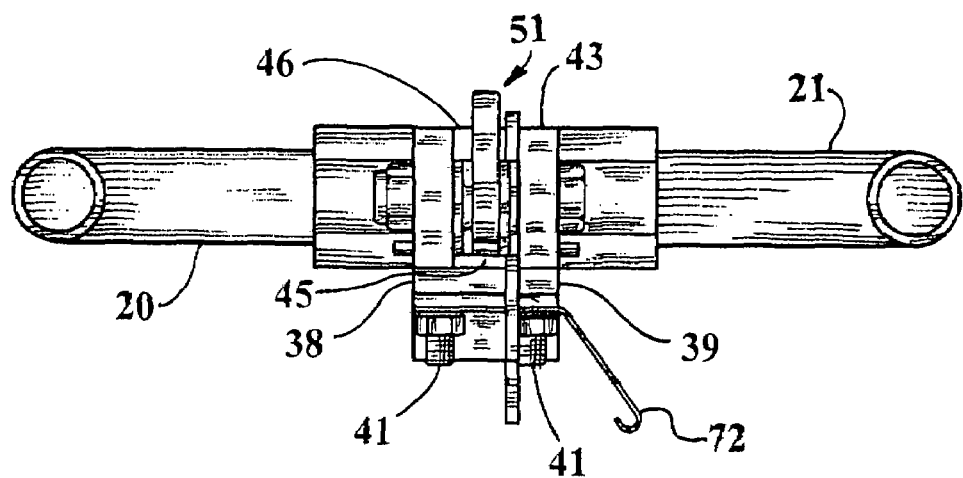
FIG. 4 is a top view of the embodiment of FIG. 2.
Figure 5:
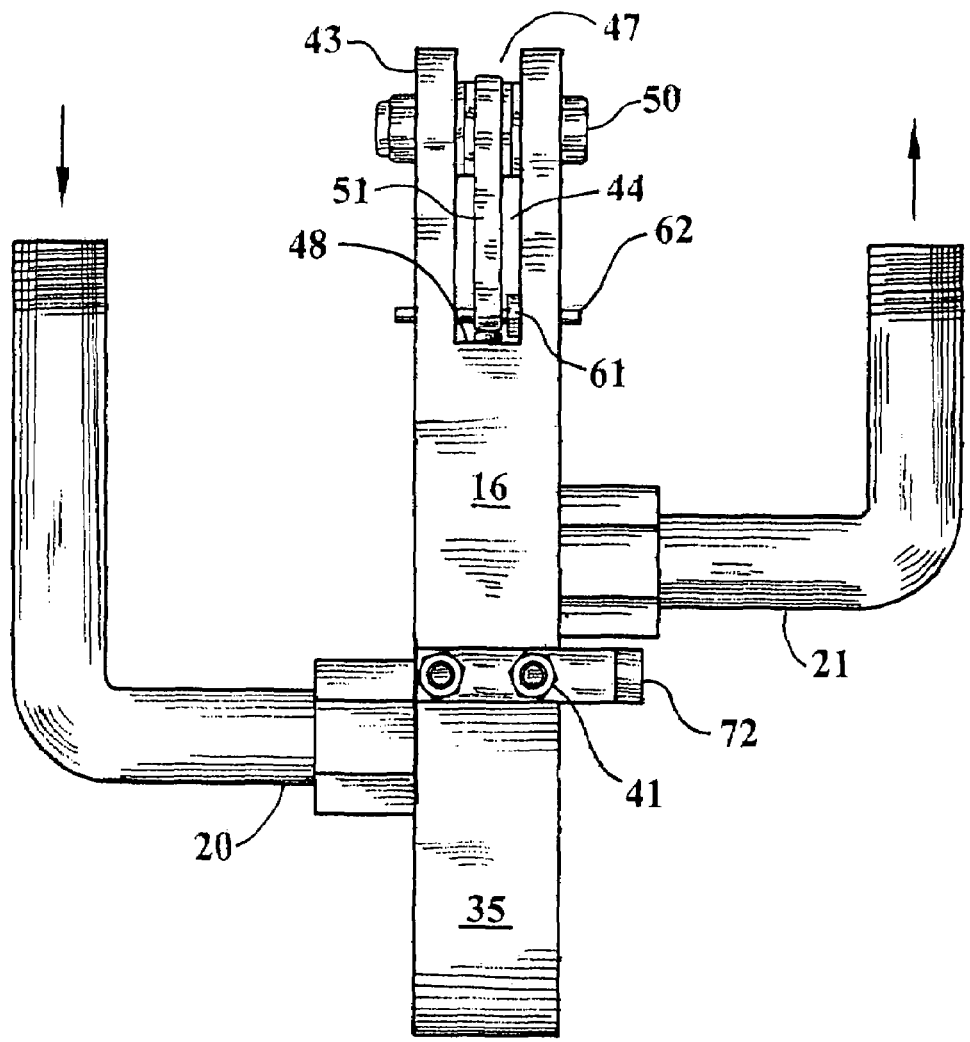
FIG. 5 is a front view taken from the right of FIG. 1.
Figure 6:
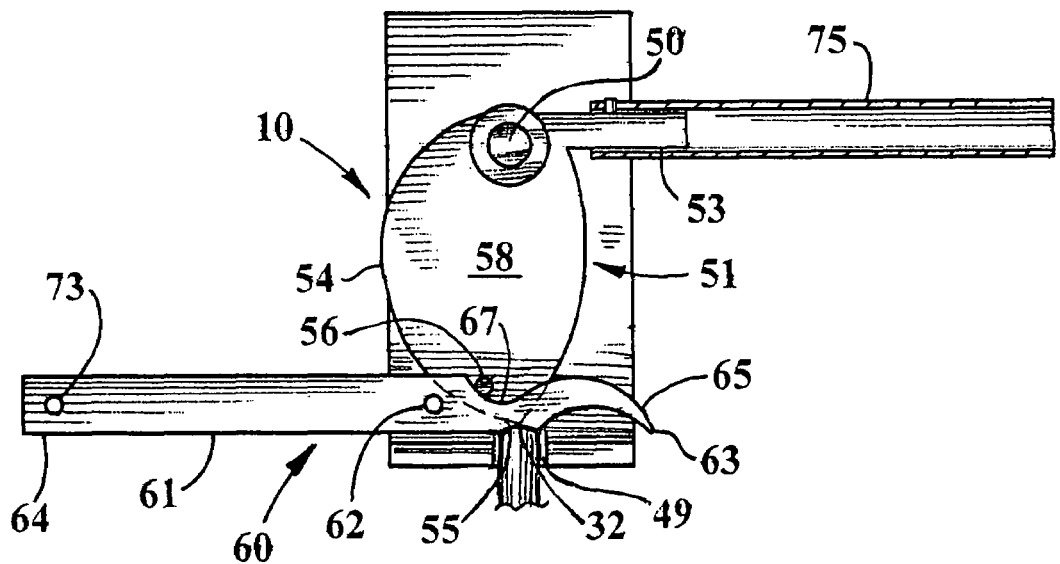
FIG. 6 is an enlarged sectional view taken upon the line 6-6 of FIG. 2.

Referring now to FIGS. 1-8 an embodiment of the trigger mechanism 10 of this invention is shown integrally associated with a water valve assembly 11 which is secured to the outside surface 12 of the retaining wall 13 of a water catching tray 14 positioned beneath an upright water heater tank 15.

Valve assembly 11 is comprised of a vertical housing 16 shown to have a rectangular cross sectional contour and a center channel 17 that communicates with inlet port 18 and exit port 19. Pipes 20 and 21 are threadably joined to ports 18 and 19, respectively, and terminate in threaded extremities adapted to connect to a water supply and heater 15, respectively. A threaded bottom plug 23 facilitates access to channel 17.

A coil spring 24 rests upon bottom plug 23, and is equipped with a stabilizing insert member 25. An elongated drive rod 26 centered within channel 17 extends between uppermost extremity 32 and a lowermost extremity that holds a resilient circular moving valve component 27. Said valve component is adapted to abut upwardly against annular shoulder 29 which represents a stationary valve component. Said abutment is achieved by the urging of spring 24, and accomplishes closing of the valve with respect to water flow from the water source to the water heater. A resilient gasket 30 is positioned upon said drive rod at a site above annular shoulder 29, and serves to prevent water leakage upwardly along the drive rod.

The front face 33 of housing 16 has, adjacent its bottom extremity, clamping means 34 comprised of angled panel 35 adapted to abut against interior face 36 of retaining wall 13 of tray 14. An interactive holding block 38 is adapted to abut against the exterior face of said retaining wall. An offset block 39, positioned above block 38 secures panel 35 by way of paired threaded bolts and nuts 41. By virtue of such construction, valve assembly 11 can be attached to the exterior of tray 14 without the need for drilling holes or otherwise modifying the tray.

Trigger mechanism 10 is comprised of paired embracing panels 43 upwardly emergent from valve assembly 11, preferably as continuous integral extensions of housing 16. Said panels 43 are in spaced apart parallel juxtaposition and define therebetween a confinement region 44 having open front, rear and upper extremities, 45, 46 and 47, respectively, and floor member 48 having a centered aperture 49 adapted to receive drive rod 26.

A horizontally disposed first axle 50 is journaled to said embracing panels adjacent upper extremity 47. An action arm 51 is pivotably supported by axle 50 and adapted to move in a vertical plane centered between panels 43. Said centering may be expedited by the use of spacing washers 80 on said axle. Said action arm is comprised of lever portion 53 and a cam portion 58 bounded in part by opposed flat surfaces 57, and having an arcuate bearing surface 54 that terminates in a pointed tip 55. An abutment stub 56 is laterally directed from a surface 57 of cam portion 58 adjacent tip 55.

Bearing surface 54 is adapted to contact the uppermost extremity 32 of drive rod 26. The contour of said bearing surface is such that, when action arm 51 is rotated by force applied to lever portion 53, bearing surface 54 is caused to push said drive rod downwardly against the urging of spring 24. At the extreme point of such rotation, tip 55 is in contact with uppermost extremity 32 of the drive rod.

A control assembly 60 is comprised of elongated lever 61 pivotably secured by a horizontally positioned second axle 62 journaled to said embracing panels at a site below said first axle and adjacent rear extremity 46 of said confinement region. Lever 61 extends through said confinement region, terminating in forward extremity 64 and rearward extremity 63. Said rearward extremity has a downwardly directed curved contact surface 65 adapted to receive and guide abutment stub 56 during rotative movement of action arm 51. Forward of contact surface 65, and contiguous therewith, is a notch 67 adapted to receive and hold stub 56 in a manner to prevent unwanted further movement of said action arm.

A float device 70 is adapted to reside within tray 14. An extension staff 71 extends upwardly from float 70, passing through a guide loop 72 forwardly directed from panel 35, and engaging an aperture 73 in the forward extremity 64 of lever 61. Said arrangement of components is such that, if water enters tray 14 due to leakage from tank 15, float 70 will apply upward force to forward extremity 64 of lever 61. Such action causes notch 67 to release stub 56, thereby enabling spring 24 to force the uppermost extremity of drive rod 26 out of retainment by tip 55. The ensuing upward motion of the drive rod causes moving valve component 27 to engage annular shoulder 29 to close off the flow of water to the water heater. A microswitch may be associated with housing 16 and interactive with action arm 51 in a manner to discontinue the supply of electricity or heating gas to heater tank 15 when a leak is detected.

To facilitate manual rotation of the action arm, a removable extension handle 75 may accompany the valve assembly. When not in use, said handle may be releasibly attached by way of hook and loop fastener material 76 to the rear surface 77 of housing 16.

Figure 7:
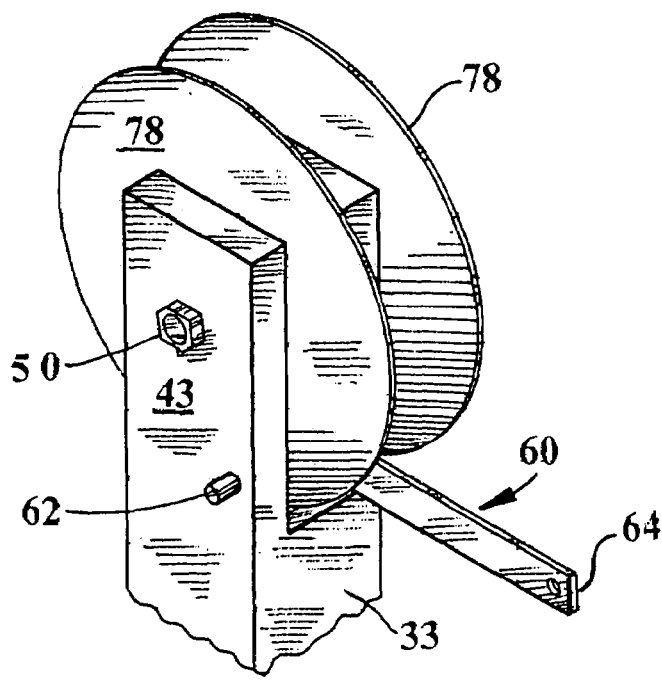
FIG. 7 is a fragmentary perspective top view of the embodiment of FIG. 1 shown with a pair of added safety discs.
Figure 8:
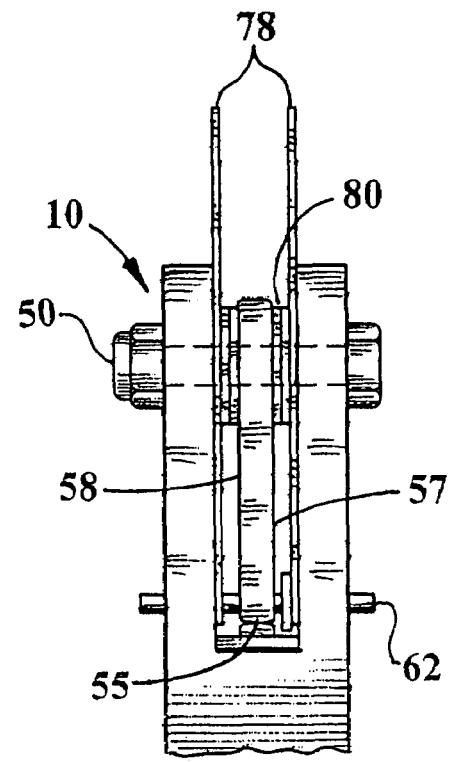
FIG. 8 is a front view of the embodiment of FIG. 7.

Protective means in the form of paired circular discs 78 may be deployed upon said first axle to embrace said action arm, as shown in FIGS. 7 and 8. The discs serve to prevent injury to the hands or fingers of the user by inadvertent triggering of the apparatus during manipulation forcing said drive rod downwardly to the open state of the valve.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A trigger mechanism for a water heater fail safe valve assembly having a vertically elongated housing, said trigger mechanism comprising:
   a) paired embracing panels upwardly emergent from said housing in spaced apart parallel juxtaposition and defining a confinement region having open front, rear and upper extremities and a floor member containing a centered aperture,
   b) a horizontally disposed first axle journaled to said panels adjacent said upper extremity,
   c) an action arm pivotably mounted upon said axle and adapted to move in a vertical plane substantially centered between said panels, said action arm comprising a lever portion and a cam portion having a curved bearing surface that terminates in a pointed tip,
   d) an abutment stub horizontally emergent from said cam portion adjacent said pointed tip,
   e) a drive rod upwardly driven by a spring and having an uppermost extremity adapted to pass through said centered aperture and contact said curved bearing surface, and
   f) a control assembly comprised of an elongated lever pivotably secured by a horizontally positioned second axle journaled to said panels at a site below said first axle and adjacent the rear extremity of said confinement region, said lever extending through said confinement region and terminating in a rearward extremity adapted to engage a rod upwardly extending from a float device, and a forward extremity having a downwardly curved contact surface integral with a contiguous rearward notch adapted to engage said abutment stub, whereby g) said valve assembly is placed in an open state when said action arm is rotated to a position where the pointed tip of said cam portion is downwardly directed and in contact with said uppermost extremity of said drive rod, and is placed in a closed state when said tip is displaced from said contact by upward movement of the rearward extremity of said elongated lever.

2. The trigger mechanism of claim 1 further comprising an extension handle removably associated with the lever portion of said action arm.

3. The trigger mechanism of claim 1 wherein said vertically elongated housing has a center channel through which said drive rod passes, and which communicates with water inlet and exit ports.

4. The trigger mechanism of claim 3 wherein said channel has a threaded bottom plug that facilitates access to said channel.

5. The trigger mechanism of claim 3 wherein said drive rod has a lowermost extremity that holds a resilient circular moving valve component.

6. The trigger mechanism of claim 5 wherein said moving valve component is adapted to abut against an annular shoulder associated with one of said ports to stop the flow of water through said valve assembly.

7. The trigger mechanism of claim 1 wherein said elongated housing is provided with clamping means interactive with a water holding tray to maintain said housing in vertical orientation.

* * * * *